J. S. MARQUETTE.
BREAKER.
APPLICATION FILED JAN. 27, 1912.

1,200,384.

Patented Oct. 3, 1916.
3 SHEETS—SHEET 1.

Witnesses
Tho. A. Richardson
Henry Mac. Arthur

Inventor
John S. Marquette
BY
William W. Varney
Attorney

J. S. MARQUETTE.
BREAKER.
APPLICATION FILED JAN. 27, 1912.
1,200,384.
Patented Oct. 3, 1916.
3 SHEETS—SHEET 2.
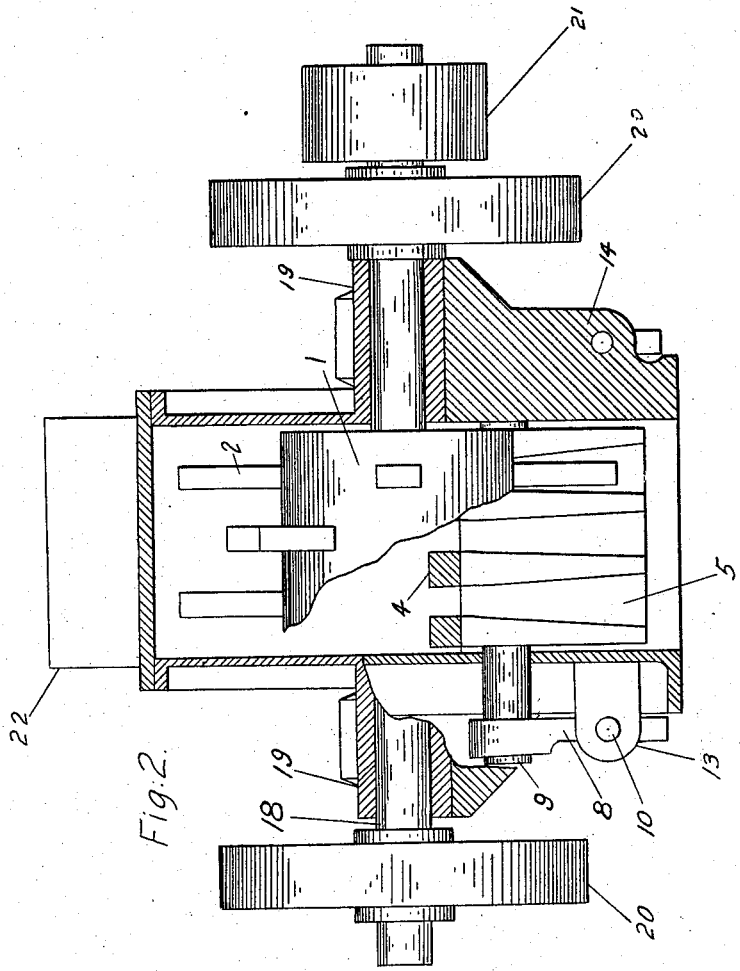

J. S. MARQUETTE.
BREAKER.
APPLICATION FILED JAN. 27, 1912.

1,200,384.

Patented Oct. 3, 1916.
3 SHEETS—SHEET 3.

UNITED STATES PATENT OFFICE.

JOHN S. MARQUETTE, OF BALTIMORE, MARYLAND.

BREAKER.

1,200,384.  Specification of Letters Patent.  Patented Oct. 3, 1916.

Application filed January 27, 1912. Serial No. 673,767.

*To all whom it may concern:*

Be it known that I, JOHN S. MARQUETTE, a citizen of the United States, residing at Baltimore city, in the State of Maryland, have invented a new and useful Breaker, of which the following is a specification.

My invention relates to improvements in breaking machines, and the object of my improvement is the providing of a breaking machine of high speed whereby a mass of material is prevented from accumulating on the grinding parts.

A further object of my invention is the providing of means of freeing the grinding parts of obstruction automatically.

A further object of my invention is the providing of means of automatically restoring the grinding means to normal position after displacement by obstructions.

A further object of my invention is the providing of means of clearance in the supports for the grinding bars.

A further object of my invention is the providing of a machine of extreme simplicity and ease of adjustment and operation in accomplishing the above desired results.

With the foregoing and other objects in view, my invention consists of the novel construction, combination and arrangement of parts as hereinafter specifically described and illustrated in the accompanying drawings wherein is shown the preferred embodiment of my invention, but it is to be understood that changes, variations and modifications can be resorted to which come within the scope of the claims hereunto appended.

Figures 1, 4:
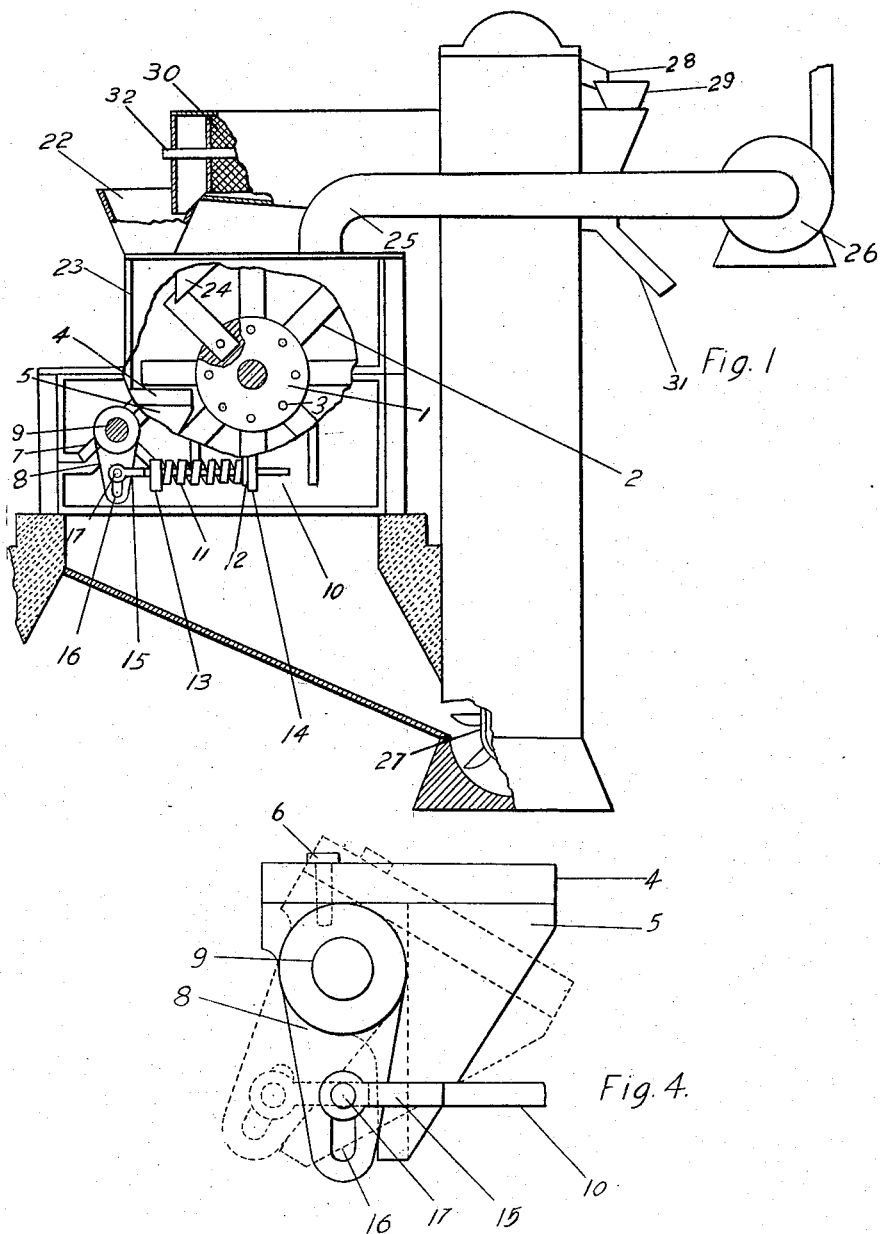
Figure 3:
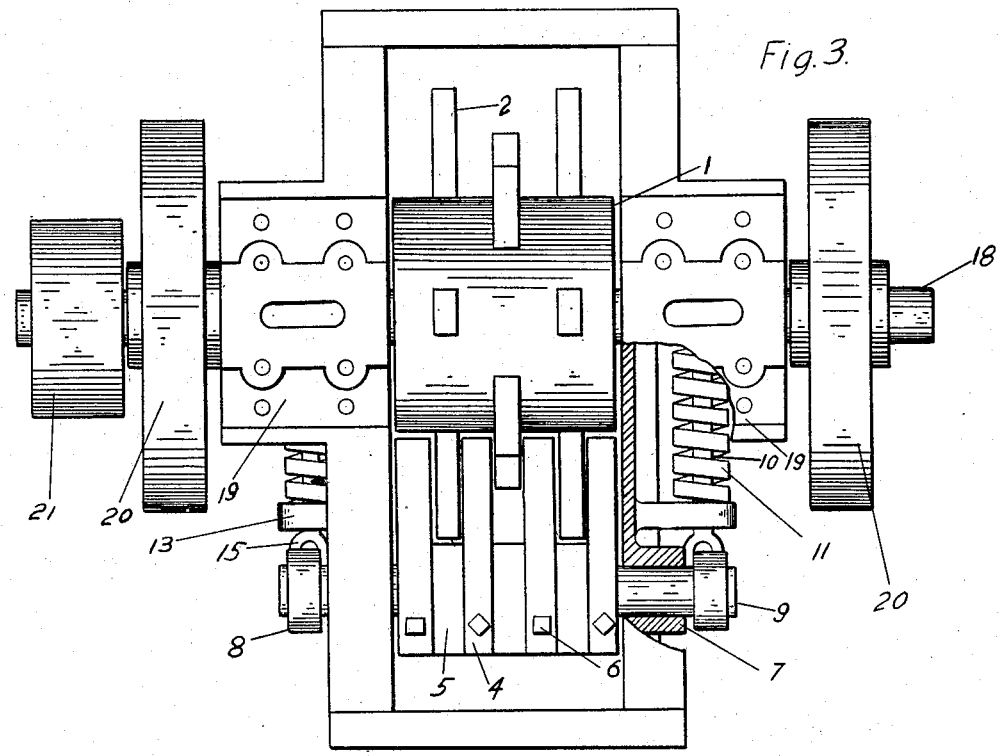

In the drawings, Figure 1 is a side view in elevation of my entire machine as installed for breaking oyster shells to the degree of fineness required in the poultry trade; Fig. 2 is a sectional view taken at right angles to that shown in Fig. 1 of the machine proper enlarged with parts of the casing removed, Fig. 3 is a plan view of the machine with the top casing removed and Fig. 4 is an enlarged view of the grinding bars and the knockdown apron.

Similar numerals refer to similar parts throughout the several views.

1 is the operating drum, 2 are the beater blades secured in recesses in operating drum 1 by means of bolts 3.

4 are the grinding blades preferably made square in cross section so that new grinding edges may be presented upon reversing and are secured to a yielding support or knockdown apron 5 by means of bolts 6 which go through holes in said bars, said knockdown apron 5 having undercut faces adjacent to the movable blades forming a clearance. Knockdown apron 5 is journaled in bearings 7 by means of shaft 9 and the slotted levers 8 are secured to shaft 9 to which knockdown apron 5 is secured.

10 is a spring bar upon which operates spring 11, 12 is a collar secured to spring bar 10 and against which spring 11 operates, the other end of the spring bearing against lug 13 and through which lug spring bar 10 operates.

14 is a web secured to the outside casing 23 and keeps spring bar 10 in alinement and through which it operates.

15 is a yoke on the end of spring bar 10 connected to the lever 8 by means of slot 16 and pin 17; spring 11 tends to keep knockdown apron 5 in a horizontal position as shown in the drawings. In case of an obstruction or stone getting in the machine face of knockdown apron 5 with the blades 4 may assume a position shown in dot in Fig. 4. Operating drum 1 is mounted on shaft 18 which shaft is journaled in bearing 19 has flywheels 20 secured to it and is operated by pulley 21.

22 is the hopper placed on the outside casing 23 in such a position as to drop the materials to be ground directly on to the grinding blades 4, and thereby the falling material being in a position to be struck by the revolving beater blades 2.

23 is the casing around the machine forming the supports for the hopper, bearings, etc.

24 is the slotted baffle casing or guide located substantially at the lower edge of the hopper to prevent the ingoing material from falling back toward the center of operating drum 11.

25 is the exhaust pipe leading to and connecting with the exhaust fan 26 and is connected under the top of casing 23 and is used for sucking the dust out of the machine or to cause an ingoing current of air in the hopper thus preventing dust in the operating room.

27 is the conveyer which conveys the ground product which has been discharged from the bottom of casing 23 up to spout 28 which spout discharges into hopper 29 at the end of screen 30. Screen 30 is on shaft 32 and is revolved by it, the hopper 29 being on one end of screen 30 receives the product delivered by conveyer 27 and feeds screen 30; the coarser particles working toward hopper 22, the finer particles being discharged through chute 31 as finished product.

The operation of the described embodiment of my machine is as follows: Shells to be ground are dumped slowly into hopper 22 where they fall by gravity onto the grinding blades 4 being directed if required by baffle 24. Operating drum 1 with inserted breaker blades 2 secured therein is operated at a high speed. Preferably the speed of the breaker blades should be greater than the falling shells of which they come in contact thus preventing a massing of the shells on the grinding blades 4 and choking of the machine. If a choking should take place or a substance be encountered that would not feed between the grinding blades 4 then the knockdown apron 5 to which are secured the grinding blades 4 gives way against the pressure of spring 11 and allows the machine to be cleared said springs restoring the apron to normal position as soon as free. After going through the breaker the ground or unground shells fall down to conveyer 27 and are by it elevated up and discharged through spout 28 into hopper 29 onto screen 30. The screened or fine parts going through and are discharged through chute 31. The unscreened or larger parts being conveyed back by the revolving screen to and discharged into hopper 22 for regrinding.

In this specification, when the word material is used I mean to include shells, bones or any other substance that might require to be ground. When I use the term, revolving blades and especially as I have described the blades in drum 1, I wish it understood that I mean, fixed, swiveled, beater or other of the ordinarily constructed revolving breaker and do not wish to limit myself to any one of the above mentioned constructions.

I claim—

1. In a breaker or grinding machine, the combination of a pair of relatively stationary blades, with a movable blade adapted to pass between the said stationary blades said stationary blades having parallel sides, and a yielding apron having an undercut face adjacent to the movable blades.

2. In a breaker or grinding machine, the combination of a pair of relatively stationary blades, with a movable blade adapted to pass between the said stationary blades, said stationary blades being secured to an apron, and a pivoted apron having an undercut frontal face, a slotted lever, secured to the pivot of said apron and a spring controlled bar freely connected with said lever for yieldingly holding said apron in normal position.

JOHN S. MARQUETTE.

Witnesses:
 Dan'l F. Reisenweber,
 William W. Varney.

Copies of this patent may be obtained for five cents each, by addressing the "Commissioner of Patents, Washington, D. C."